(12) United States Patent
Kim

(10) Patent No.: US 12,105,888 B2
(45) Date of Patent: Oct. 1, 2024

(54) GESTURE DETECTION SENSOR, READER MODULE, AND GESTURE DETECTION SYSTEM

(71) Applicant: KOREA ELECTRONICS TECHNOLOGY INSTITUTE, Seongnam-si (KR)

(72) Inventor: Kunnyun Kim, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/212,805

(22) Filed: Jun. 22, 2023

(65) Prior Publication Data

US 2023/0418387 A1 Dec. 28, 2023

(30) Foreign Application Priority Data

Jun. 23, 2022 (KR) .................. 10-2022-0076900

(51) Int. Cl.
*G06F 3/01* (2006.01)
(52) U.S. Cl.
CPC .............. *G06F 3/017* (2013.01); *G06F 3/014* (2013.01)
(58) Field of Classification Search
CPC .................. G06F 3/017; G06F 3/014
See application file for complete search history.

(56) References Cited

U.S. PATENT DOCUMENTS

2016/0018892 A1* 1/2016 Gu .................. G06F 3/016
345/156
2018/0077980 A1* 3/2018 Hull ................ A41D 19/0058

FOREIGN PATENT DOCUMENTS

| KR | 10-2017-0053854 A | 5/2017 |
| KR | 10-2032539 B1 | 10/2019 |
| KR | 10-2022-0049105 A | 4/2022 |

OTHER PUBLICATIONS

Korean Office Action issued on Mar. 22, 2024, in counterpart Korean Patent Application No. 10-2022-0076900 (2 pages in English, 5 pages in Korean).

* cited by examiner

*Primary Examiner* — Abbas I Abdulselam
(74) *Attorney, Agent, or Firm* — NSIP Law

(57) ABSTRACT

A gesture detection system is disclosed. The gesture detection system includes a gesture detection sensor including a base sheet formed of a skin-conformable material, to be tightly attached to a skin, a sensing part formed at the base sheet, to measure deformation of the skin, and an electrode pattern formed at the base sheet and connected, at one end thereof, to the sensing part, to transmit an electrical signal varying in accordance with the deformation of the skin, a reader module connected to the gesture detection sensor, to read the electrical signal, and a computing device configured to receive the electrical signal from the reader module, thereby recognizing a gesture of the user. Through disposable use of the gesture detection sensor and multiple use of the reader module and the computing device, a hygienic gesture input environment may be provided to a plurality of users at low cost.

20 Claims, 12 Drawing Sheets

211 : 211a, 211b, 211c, 211d, 211e

211 : 211a, 211b, 211c, 211d, 211e

211 : 211a, 211b, 211c, 211d, 211e

Paper (P)　　　Rock (R)　　　Scissor (S)　　　Gun (G)

OK (ok)　　　Thumb Up (U)　　　Nip (N)　　　One (1)

Three (3)　　　Four (4)　　　Three-with thumb (3T)

GESTURE DETECTION SENSOR, READER MODULE, AND GESTURE DETECTION SYSTEM

CROSS REFERENCE TO RELATED APPLICATION

The present application claims priority to Korean Patent Application No. 10-2022-0076900, filed on Jun. 23, 2022, the entire contents of which is incorporated herein for all purposes by this reference.

BACKGROUND OF THE INVENTION

Field of the Invention

The present disclosure relates to a gesture detection sensor, a reader module, and a gesture detection system.

Description of the Related Art

Devices such as a keyboard, a mouse, a touchpad, and an electronic pen are used to input a command to a computer device. Recently, technologies for inputting a command using the body, for example, a voice, a motion, a gesture, etc. of the body, have been developed. Among these technologies, a technology for detecting a gesture has been advanced mainly in conjunction with movement of a hand. Conventional detection sensors have been developed in the form of a glove enclosing a hand. The detection sensor having the form of a glove employs a system in which a sensor such as a strain gauge or the like is disposed at a glove and, as such, measures a degree of bending of a finger joint.

RELATED ART LITERATURE

Patent Documents

Patent Document 1: KR 10-2017-0053854 A

SUMMARY OF THE INVENTION

Therefore, the present disclosure has been made in view of the above problems, and it is an aspect of the present disclosure to provide a gesture detection sensor detachably attachable to a hand.

It is another aspect of the present disclosure to provide a reader module detachably attachable to a gesture detection sensor attached to a hand.

It is another aspect of the present disclosure to provide a gesture detection system including a gesture detection sensor and a reader module.

In accordance with an aspect of the present disclosure, the above and other objects can be accomplished by the provision of a gesture detection sensor including a base sheet formed of a skin-conformable material and configured to be tightly attached to a skin, a sensing part formed at the base sheet and configured to measure deformation of the skin, and an electrode pattern formed at the base sheet and connected, at one end thereof, to the sensing part, to transmit an electrical signal varying in accordance with the deformation of the skin.

In accordance with an embodiment, the sensing part may include a strain gauge pattern, to measure the deformation of the skin through a variation in resistance.

In accordance with an embodiment, the base sheet may be attached to a back of a hand, and the sensing part may include at least one of a first sensing part configured to measure deformation of the skin caused by movement of a thumb, a second sensing part configured to measure deformation of the skin caused by movement of an index finger, a third sensing part configured to measure deformation of the skin caused by movement of a middle finger, a fourth sensing part configured to measure deformation of the skin caused by movement of a ring finger, or a fifth sensing part configured to measure deformation of the skin caused by movement of a baby finger.

In accordance with an embodiment, the gesture detection sensor may further include a cover sheet configured to cover the base sheet and to be adhered to the skin, thereby fixing the base sheet to the skin.

In accordance with an embodiment, the gesture detection sensor may further include a first contact pad disposed at another end of the electrode pattern and connected to the reader module, and the cover sheet may include an exposure part configured to expose a portion of the cover sheet where the first contact pad is formed.

In accordance with an embodiment, the gesture detection sensor may further include an isolation structure configured to isolate the first to fifth sensing parts from one another, and the isolation structure may be formed through removal of portions of the base sheet and portions of the cover sheet disposed among the first to fifth sensing parts.

In accordance with an embodiment, the isolation structure may be formed by further forming an isolation layer made of a material having stretchability lower than stretchability of the base sheet or the cover sheet among the first to fifth sensing parts.

In accordance with an embodiment, the gesture detection sensor may further include an adhesive layer formed on a portion of the base sheet exposed by the exposure part, to fix the reader module.

In accordance with an embodiment, the gesture detection sensor may further include a first protection layer configured to be removed prior to attachment of the base sheet to the skin, and a second protection layer configured to be removed prior to adhesion of the reader module to the adhesive layer.

In accordance with another aspect of the present disclosure, there is provided a reader module including a contact board connected to a gesture detection sensor attached to a skin and configured to receive an electrical signal varying in accordance with movement of a finger, a communicator configured to transmit and receive data to and from a computing device, a controller configured to receive the electrical signal from the contact board and to transmit the received electrical signal to the computing device via the communicator, a main board connected to the contact board and mounted with the communicator and the controller thereon, and a housing configured to support the contact board and the main board disposed therein and formed to expose a portion of the contact board.

In accordance with an embodiment, the contact board may include a flexible part formed of a flexible material and connected to an electrode pattern of the gesture detection sensor, and a fixed part physically fixedly connected to the main board and configured to transmit an electrical signal received by the flexible part to the main board.

In accordance with an embodiment, the housing may be held on a wrist, and the flexible part may extend from the housing, and may be connected to the gesture detection sensor.

In accordance with another aspect of the present disclosure, there is provided a gesture detection system including a gesture detection sensor configured to be attached to a back of a hand of a user and to measure a variation in electrical signal caused by movement of a finger, a reader module configured to receive an electrical signal from the gesture detection sensor, thereby providing the electrical signal, and a computing device configured to analyze the electrical signal received from the reader module, thereby recognizing a gesture of the user.

In accordance with an embodiment, the computing device may include a communicator connected to the reader module, to receive data from the reader module, a storage unit configured to store a recognition model configured to learn a pattern of an electrical signal including movements of a plurality of fingers, thereby recognizing a gesture, and a processor configured to input the electrical signal to the recognition model, thereby recognizing the gesture.

In accordance with an embodiment, the recognition model may be an artificial intelligence model configured to perform learning through a learning data set using, as input data, a first electrical signal reflecting movement of a thumb, a second electrical signal reflecting movement of an index finger, a third electrical signal reflecting movement of a middle finger, a fourth electrical signal reflecting movement of a ring finger, and a fifth electrical signal reflecting movement of a baby finger when a particular gesture is made, while using a kind of a particular gesture as labeled date, and to output a kind of a gesture when the first to fifth electrical signals corresponding to the gesture are input.

In accordance with an embodiment, the processor may execute a predetermined command in accordance with the kind of gesture determined by the recognition model.

Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for best explanation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
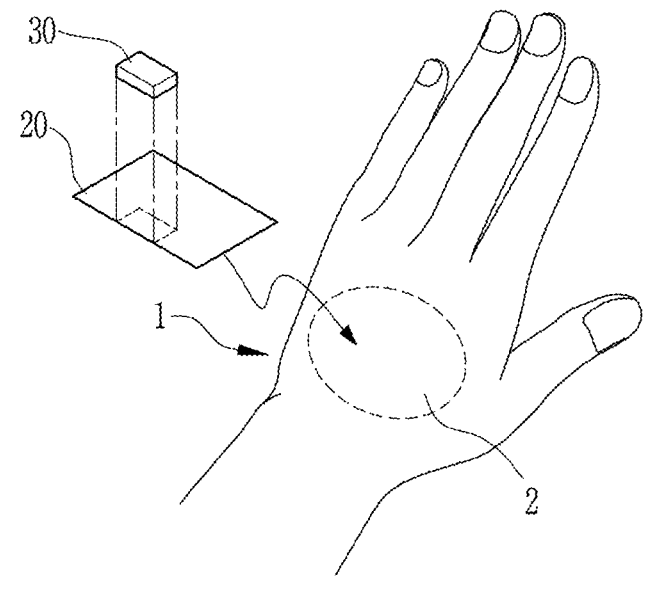
FIG. 1 is a view showing a gesture detection system according to an exemplary embodiment of the present disclosure.
Figure 1:
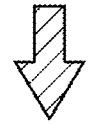
Figure 1:
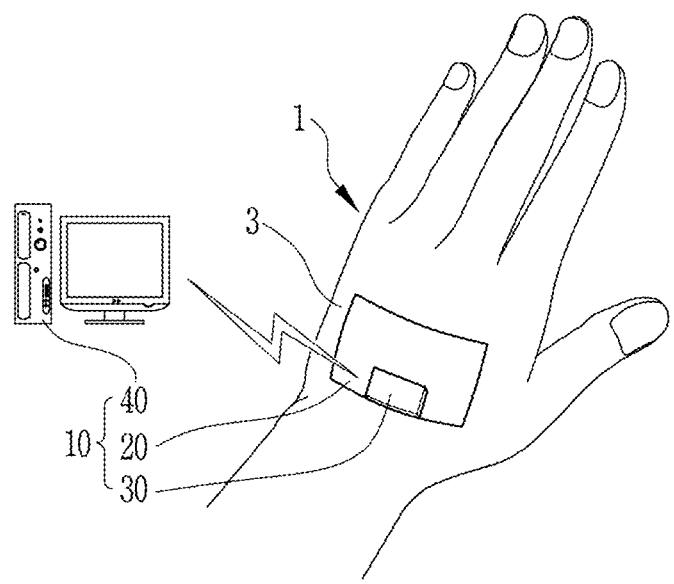

Objects, particular advantages and new features of the present disclosure will be more clearly understood from the following detailed description and preferred embodiments taken in conjunction with the accompanying drawings. However, the present disclosure is not limited to the embodiments. In the following description, when a detailed description of the relevant known function or configuration is determined to unnecessarily obscure the subject matter of the present disclosure, such detailed description will be omitted.

In the specification, in adding reference numerals for elements in each drawing, it should be noted that like reference numerals already used to denote like elements in one drawing are also used to denote the elements in another drawing wherever possible.

It should be noted that terms used herein are merely used to describe a specific embodiment, not to limit the present disclosure. Incidentally, unless clearly used otherwise, singular expressions include a plural meaning.

Hereinafter, exemplary embodiments of the present disclosure will be described in detail with reference to the accompanying drawings.

FIG. 1 is a view showing a gesture detection system 10 according to an exemplary embodiment of the present disclosure.

The gesture detection system 10 according to the exemplary embodiment of the present disclosure may include a gesture detection sensor 20 configured to be attached to the back of the hand of the user and to measure a variation in an electrical signal caused by movement of a finger, a reader module 30 configured to receive an electrical signal from the gesture detection sensor 20, thereby providing the electrical signal, and a computing device 40 configured to analyze the electrical signal received from the reader module 30, thereby recognizing a gesture of the user.

The gesture detection sensor 20 may detect deformation of skin 3 caused by movement of a finger when the user makes a particular gesture with their hand 1. The reader module 30 may be connected to the gesture detection sensor 20. The reader module 30 may provide an electrical signal received from the gesture detection sensor 20 to the computing device 40. The computing device 40 may analyze the electrical signal, thereby recognizing the kind of a gesture input by the user. The computing device 40 may execute a predetermined command in accordance with the recognized gesture.

The gesture detection sensor 20 may be detachably attached to a hand back 2 of the user. Since the gesture detection sensor 20 is attached to the hand back 2, there is no inconvenience in association with gripping of an article or execution of other tasks by the palm of the hand. The gesture detection sensor 20 and the reader module 30 may be separably coupled to each other. The gesture detection sensor 20 may be disposable. The reader module 30 may be repeatedly usable.

Plural users may use one gesture detection system 10 through the following method. A first user may use a gesture input system by attaching a disposable gesture detection sensor 20 to the back 2 of their hand and attaching the reader module 30 to the disposable gesture detection sensor 20. After the first user completes use of the gesture input system, the used gesture detection sensor 20 may be disposable. A second user may attach a new disposable gesture detection sensor 20 to the back 2 of their hand without using the gesture detection sensor 20 used by the first user, and may attach the reader module 30 used by the first user to the new gesture detection sensor 20. Accordingly, there is an advantage in terms of hygiene in that each user attaches a new gesture detection sensor 20 to the back of their hand, and there is an advantage in terms of economy in that the reader module 30 is repeatedly usable. The reader module 30 may be maintained in a state of being connected to the computing device 40 during change of users. Accordingly, the second user may rapidly complete ready for use of the gesture detection system 10.

In recent years, users may access diverse spaces such as virtual reality (VR), augmented reality (AR), the metaverse, or the like through a computer device. In order to popularize a gesture input system as an input system in such a cyber space, it is necessary for many users to experience the gesture input system. The gesture detection sensor 20 according to the exemplary embodiment of the present disclosure has a form attachable to the hand back 2, differently from a conventional glove type input device, and, as such, may provide a convenient and hygienic gesture input environment to users.

Figure 2:
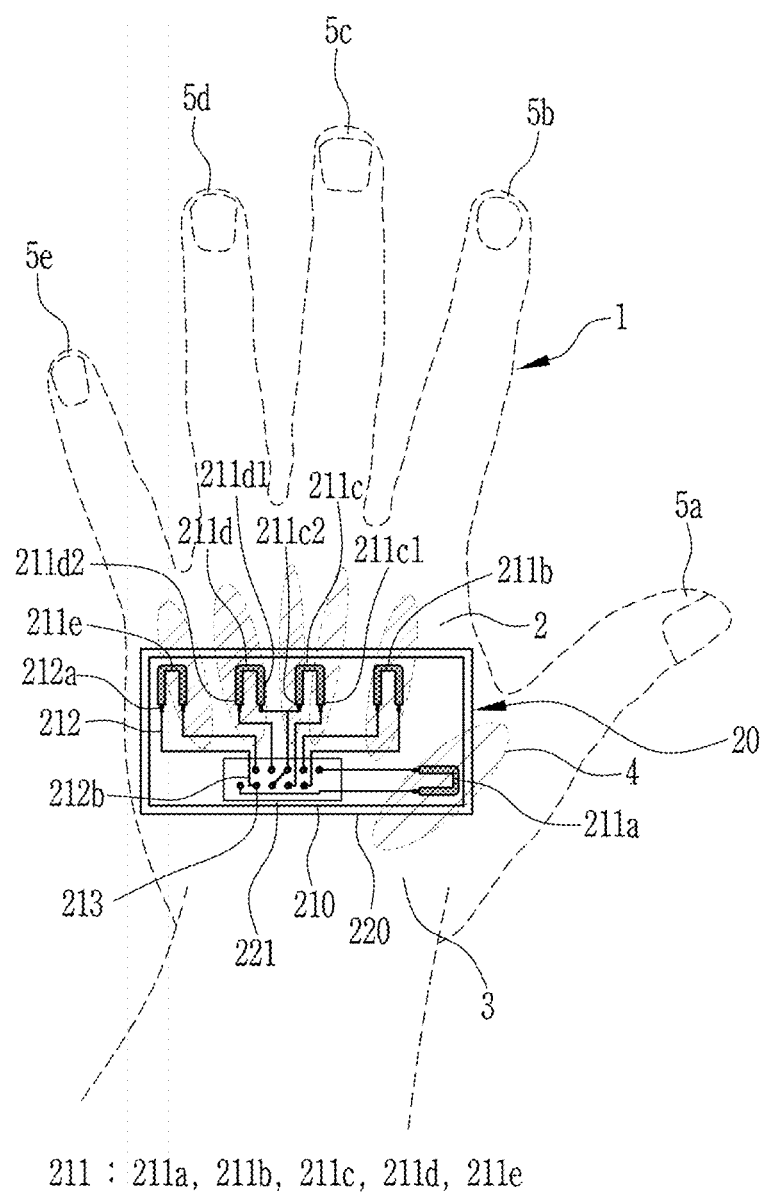
FIG. 2 is a plan view showing a configuration of the gesture detection sensor according to an exemplary embodiment of the present disclosure.
Figure 3:
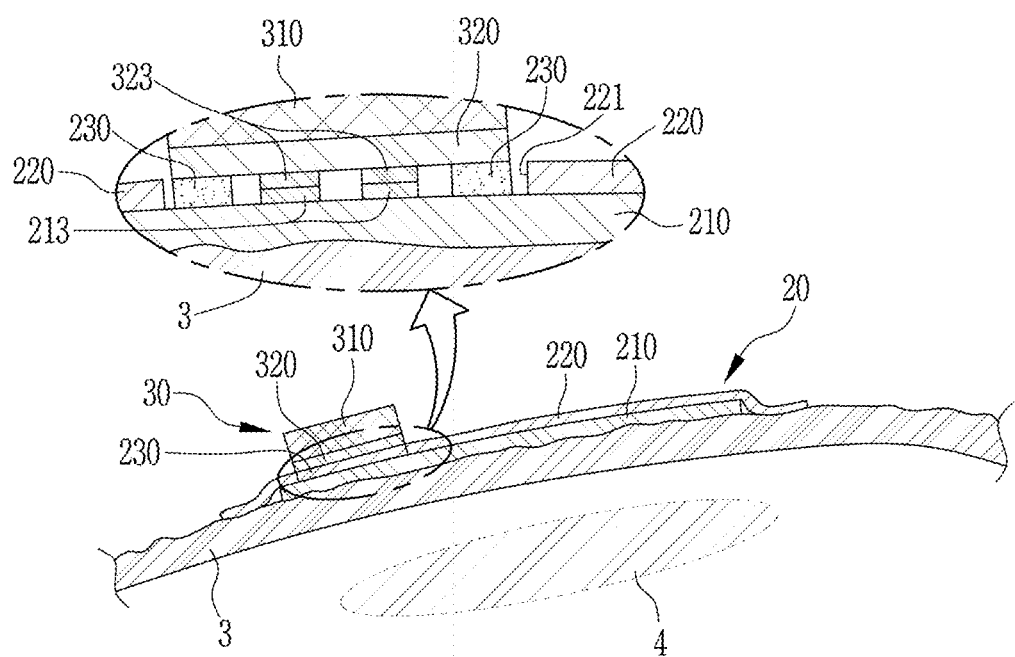
FIG. 3 is a sectional view of the gesture detection sensor according to the exemplary embodiment of the present disclosure.

FIG. 2 is a plan view showing a configuration of the gesture detection sensor 20 according to an exemplary embodiment of the present disclosure. FIG. 3 is a sectional view of the gesture detection sensor 20 according to the exemplary embodiment of the present disclosure. FIGS. 2 and 3 briefly show muscles 4.

The gesture detection sensor 20 according to the exemplary embodiment of the present disclosure may include a base sheet 210 formed of a skin-conformable material and configured to be tightly attached to the skin 3, a sensing part 211 formed at the base sheet 210 and configured to measure deformation of the skin 3, and an electrode pattern 212 formed at the base sheet 210 and connected, at one end thereof, to the sensing part 211, to transmit an electrical signal varying in accordance with the deformation of the skin 3.

The base sheet 210 may be formed of a material having skin conformability and skin compatibility. The sensing part 211 and the electrode pattern 212 of the gesture detection sensor 20 may be formed at the base sheet 210.

The skin-conformable material is a material having physical characteristics similar to those of the skin 3. The base sheet 210, which is formed of the skin-formable material, may have stretchability similar to or greater than that of the skin 3. Accordingly, the base sheet 210 may be attached to the skin 3 in a tight contact state.

The skin-conformable material suitable for formation of the base sheet 210 is a material having lower Young's modulus than that of the skin 3. The following Table 1 shows results obtained by comparing values of Young's modulus of materials or products (indicated by trademarks) with that of the skin 3. The base sheet 210 may be manufactured using various composite materials and, as such, Table 1 shows approximate values.

TABLE 1

| Nos. | Materials | Young's Modulus (unit: Pa) |
|---|---|---|
| 1 | Polyimide (PI) | 2.8 GPa |
| 2 | Polydimethylsiloxane (PDMS) | 3.7 MPa |
| 3 | Solaris | 251.53 kPa |
| 4 | Polyurethane (PU) | 28.13 kPa |
| 5 | Clear Flex 30 ™ | 15.76 kPa |
| 6 | Tegaderm ™ | 4.75 kPa |
| 7 | Ecoflex 0030 ™ | 1.53 kPa |

For example, the base sheet may be formed of a material having low Young's modulus such as Tegaderm™, Ecoflex 0030™, or the like. The base sheet 210 may be formed of an elastomer such as Tegaderm™, Ecoflex 0030™, or the like. The skin 3 exhibits different values of Young's modulus at different parts of the body, and the base sheet 210 is attached to the hand back 2. Accordingly, the base sheet 210 may be formed of a material having lower Young's modulus than that of the skin 3 of the hand back 2. For the base sheet 210, a composite material may be used. Accordingly, the base sheet 210 may be formed of a composite material composed to have lower Young's modulus than that of the skin 3 while including materials such as polyurethane (PU), polyimide (PI), polydimethylsiloxane (PDMS), Solaris, etc. The skin-conformable material is a material providing safety to the skin 3 even when the material is directly attached to the skin 3. The base sheet 210 formed of the skin-conformable material may not generate a trouble at the skin 3 when the base sheet 210 is attached to the skin 3. Since the base sheet 210 has physical properties similar to those of the skin 3, the base sheet 210 may be deformed together with the skin 3 in accordance with deformation of the skin 3 when the base sheet 210 is attached to the skin 3. The skin 3 may be deformed in accordance with movement of the muscles 4 disposed under the skin 3. Accordingly, movement of the muscles 4 may be recognized through detection of deformation of the skin 3.

One or more sensing parts 211 may be formed at the base sheet 210. For the sensing part 211, sensors of various types may be used. The sensing part 211 may include a pressure sensor configured to measure a pressure generated in accordance with movement of the muscles 4 under the skin 3. Alternatively, the sensing part 211 may include a strain gauge pattern and, as such, deformation of the skin 3 may be measured through a variation in resistance. When the muscles 4 under the skin 3 move and, as such, the skin 3 is stretched, the strain gauge pattern printed on the base sheet 210 attached to the skin 3 is stretched and, as such, a resistance thereof may be varied. The strain gauge pattern of the sensing part 211 may be formed to have various pattern shapes such as a serpentine shape, a spiral shape, a comb shape, etc. The sensing part 211 shown in FIGS. 2, 4, and 5 has a horseshoe shape. The sensing part 211 shown in FIG. 6 has a straight shape. A concrete shape of the sensing part 211 is not limited to those disclosed and illustrated in the present disclosure and the accompanying drawings.

The sensing part 211 may be disposed in plural such that the plural sensing parts are disposed at fingers, respectively. The sensing part 211 may include at least one of a first sensing part 211a configured to measure deformation of the skin 3 caused by movement of a thumb 5a, a second sensing part 211b configured to measure deformation of the skin 3 caused by movement of an index finger 5b, a third sensing part 211c configured to measure deformation of the skin 3 caused by movement of a middle finger a fourth sensing part 21d configured to measure deformation of the skin 3 caused by movement of a ring finger 5d, or a fifth sensing part 211e configured to measure deformation of the skin 3 caused by movement of a baby finger 5e. All or a part of the first to fifth sensing parts 211a to 211e may be formed at the base sheet 210.

The base sheet 210 may be attached to the skin 3 of the hand back 2. The first sensing part 211a may be formed at a position of the base sheet 210 corresponding to a muscle 4 moving the thumb 5a. The second sensing part 211b may be formed at a position of the base sheet 210 corresponding to a muscle 4 moving the index finger 5b. The third sensing part 211c may be formed at a position of the base sheet 210 corresponding to a muscle 4 moving the middle finger 5c. The fourth sensing part 211d may be formed at a position of the base sheet 210 corresponding to a muscle 4 moving the ring finger 5d. The fifth sensing part 211e may be formed at a position of the base sheet 210 corresponding to a muscle 4 moving the baby finger 5e.

Spacing among the first to fifth sensing parts 211a to 211e may be varied in accordance with a hand size of the user. For example, a large type gesture detection sensor 20 in which spacing among the first to fifth sensing parts 211a to 211e is large, and the base sheet 210 has a large area, a medium type gesture detection sensor 20 in which spacing among the first to fifth sensing parts 211a to 211e is medium, and the base sheet 210 has a medium area, and a small type gesture detection sensor 20 in which spacing among the first to fifth sensing parts 211a to 211e is small, and the base sheet 210 has a small area may be manufactured.

The electrode pattern 212 may be formed at the base sheet 210 such that one end 212a thereof is connected to the sensing part 211. In FIG. 2, the electrode pattern 212 is shown as a line. The other end 212b of the electrode pattern 212 may be connected to the reader module 30. The gesture detection sensor 20 may further include a first contact pad 213 disposed at the other end 212b of the electrode pattern 212 and connected to the reader module 30. In FIG. 2, the first contact pad 213 is shown as a round point. The first contact pad 213 may be connected to a second contact pad 323 formed at the reader module 30. The first contact pad 213 may be formed to have a greater thickness or a greater area than that of the electrode pattern 212. When plural electrode patterns 212 are provided, other-side ends 212b of the electrode patterns 212 may be concentratedly disposed at a portion of the base sheet 210.

When the sensing part 211 is of a strain gauge type, two electrode patterns 212 may be connected to the sensing part 211. For example, in the case of FIG. 2, two electrode patterns 212 may be connected to each sensing part, for example, the fifth sensing part 211e, and other-side ends 212b thereof may be disposed at a predetermined portion of the base sheet 210.

Two sensing parts 211, which are of a strain gauge type, may be connected to one electrode pattern 212. For example, in the case of FIG. 2, the third sensing part 211c may be formed, at one end 211c1 thereof, with one electrode pattern 212 while being formed, at the other end 211c2 thereof with another electrode pattern 212 connected to one end 211d1 of the fourth sensing part 211d, and another electrode pattern 212 may be formed at the other end 211d2 of the fourth sensing part 211d, and, as such, two sensing parts 211 may be interconnected by three electrode patterns 212. The electrode pattern 212, which interconnects the third sensing part 211c and the fourth sensing part 211d, may be formed with two first contact pads 213 at the other end thereof.

Connection patterns of a plurality of sensing parts 211 and a plurality of electrode patterns 212 may form diverse circuits in accordance with the kind of the sensing parts 211, the type of the sensing parts 211 for measurement of an electrical signal, etc. Of course, it is preferred that other-side ends of the electrode patterns 212 be concentratedly disposed at a predetermined portion of the base sheet 210, for connection to the reader module 30.

A cover sheet 220 may be formed to have a greater area than that of the base sheet 210. The cover sheet 220 may be configured to cover at least a portion of the base sheet 210 and to be adhered to the skin 3, thereby fixing the base sheet 210 to the skin 3. The cover sheet 220 may completely cover the base sheet 210, and an edge of the cover sheet 220 may be adhered to the skin 3. The cover sheet 220 may be formed with an adhesive material at a surface thereof to be attached to the skin 3, as in a care band. The cover sheet 220 functions to bring the base sheet 210 into tight contact with the skin 3 such that deformation of the skin 3 caused by movement of the muscle 4 is effectively transmitted to the sensing part 211.

The cover sheet 220 may include an exposure part 221 formed through removal of a portion of the cover sheet 220 and configured to expose a portion of the cover sheet 220 where the first contact pad 213 is formed. The portion of the cover sheet 220 exposed by the exposure part 221 is a region where other-side ends of electrode patterns 212 and first contact pads 213 are concentratedly disposed. The exposure part 221 may provide a space in which the cover sheet 210 and the reader module 30 are coupled to each other. The exposure part 221 is an empty space from which a portion of the cover sheet 220 is removed. The exposure part may expose the other end 212b of the electrode pattern 212, the first contact pad 213, and a portion of the base sheet 210. A contact board 320 of the reader module 30 may be coupled to the portion of the base sheet 210 exposed by the exposure part 221 in an adhesion manner. The shape of the exposure part 221 may be determined in accordance with the shape of the contact board 320 of the reader module 30.

The gesture detection sensor 20 may further include an adhesive layer 230 formed on the portion of the base sheet 210 exposed by the exposure part 221. The adhesive layer is formed to fix the reader module 30 to the gesture detection sensor 20. The adhesive layer 230 may separably fix the reader module 30. The contact board 320 of the reader module 30 may be adhered to the adhesive layer 230, thereby enabling the second contact pad 323 formed at the contact board 320 and the first contact pad 213 formed at the base sheet 210 to contact each other. The adhesive layer 230 may be formed to expose the first contact pad 213.

Figure 4:
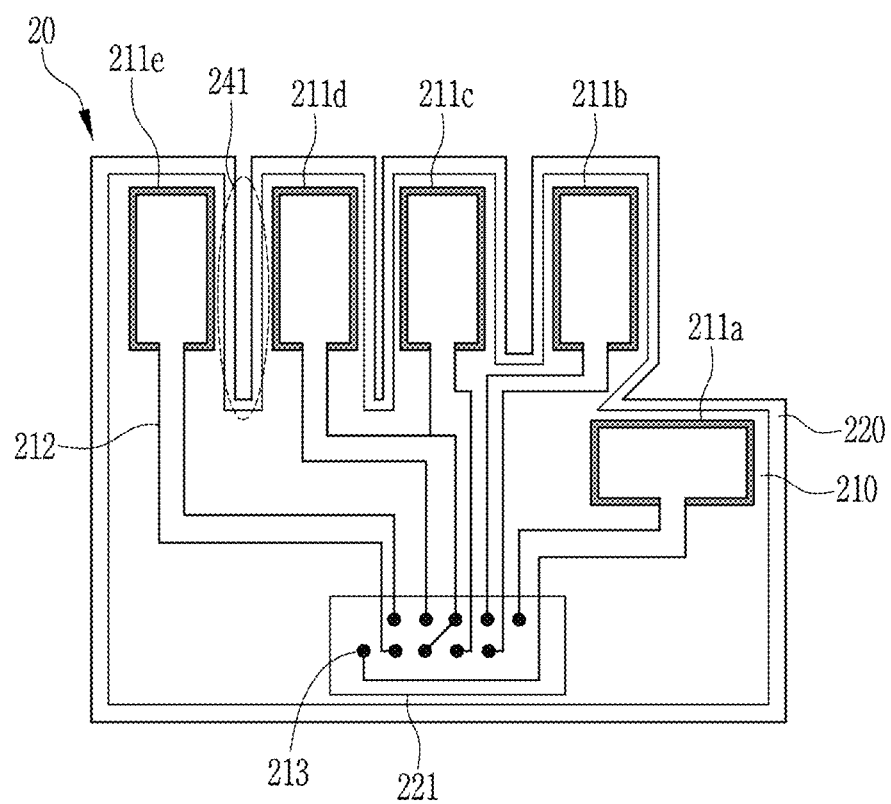
FIG. 4 is a view showing a structure of the gesture detection sensor according to another exemplary embodiment of the present disclosure.
Figure 5:
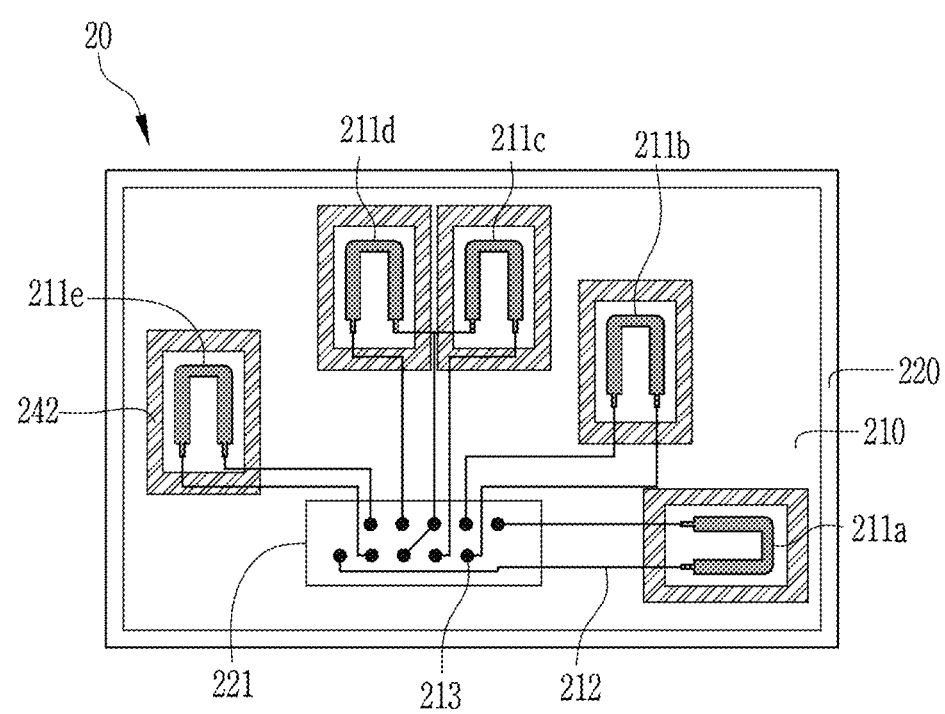
FIG. 5 is a view showing a structure of the gesture detection sensor according to another exemplary embodiment of the present disclosure.

FIG. 4 is a view showing a structure of the gesture detection sensor 20 according to another exemplary embodiment of the present disclosure. FIG. 5 is a view showing a structure of the gesture detection sensor 20 according to another exemplary embodiment of the present disclosure.

The index finger 5b and the middle finger 5c each has a unipennate structure moved by one muscle. The ring finger 5d and the baby finger 5e each have a bipennate structure moved by two muscles. The ring finger 5d holds the muscles of the middle finger 5c and the baby finger 5e in common. The gesture detection sensor 20 operates on the basis of a principle that deformation of the skin 3 caused by movement of muscles is measured by the sensing part 211 and, as such, there may be a possibility that movement of one finger is sensed by the sensing part 11 corresponding to another finger adjacent to the former finger. In order to prevent such erroneous measurement, an isolation structure capable of isolating the first to fifth sensing parts 211a to 211e from one another may be provided.

The gesture detection sensor 20 may further include an isolation structure configured to isolate the first to fifth sensing parts 211a to 211e from one another. As shown in FIG. 4, the isolation structure may be formed by removing portions of the base sheet 210 and portions of the cover sheet 220 disposed among the first to fifth sensing parts 211a to 211e.

The isolation structure may be embodied as a structure formed through removal of portions of the base sheet 210 and the cover sheet 220. The base sheet 210 and the cover sheet 220 may be removed between the first sensing part 211a and the second sensing part 211b, between the second sensing part 211b and the third sensing part 211c, between the third sensing part 211c and the fourth sensing part 211d, and between the fourth sensing part 211d and the fifth sensing part 211e. As a result, concave portions 241 recessed to have a concave shape may be formed among the first to fifth sensing parts 211a to 211e, respectively. Each concave portion 241 may prevent a phenomenon in which force generated when a certain finger moves is transmitted to the sensing unit 211 adjacent to the finger along the base sheet 210 and the cover sheet 220. In other words, the isolation structure formed with the concave portions 241 may prevent the base sheet 210 and the cover sheet 220 from transmitting deformation of the skin 3 to the adjacent sensing part 211.

As shown in FIG. 5, the isolation structure may be formed by further forming an isolation layer 242 made of a material having lower stretchability than that of the base sheet 210 or the cover sheet 220 among the first to fifth sensing parts 211a to 211e. The isolation structure may be formed to have a shape surrounding each sensing unit 211. The isolation layer 242 may be formed between the base sheet 210 and the cover sheet 220. The isolation layer 242 is formed of a material having high Young's modulus and, as such, is not deformed when movement of a finger is transmitted to the skin 3, differently from the base sheet 210 or the cover sheet 220. Accordingly, the isolation layer 242 may not transmit deformation of the skin 3 caused by movement of a finger to the sensing unit 211 adjacent to the finger. The isolation layer 242 is formed to surround the sensing part 211 and, as such, may partition the skin 3 such that only deformation of the skin 3 in a region surrounded by the isolation layer 242 is transmitted to the sensing part 211.

Both the isolation structure in which the concave portions 241 are formed at the base sheet 210 and the cover sheet 220 and the isolation structure in which the isolation layer 242 surrounding the sensing part 211 are further formed may enhance gesture input accuracy because both the isolation structures do not transmit deformation of the skin 3 to the sensing unit 211 not associated with the skin deformation.

The position of the sensing unit 211 corresponding to each finger may be diverse. As shown in FIG. 4, the second to fifth sensing parts 211b to 211e may be disposed to be aligned with one another, and the first sensing part 211a may be disposed under the second sensing part 211b in a diagonal direction. As shown in FIG. 5, the third and fourth sensing parts 211c and 211d may be disposed in parallel, the second and fifth sensing parts 211b and 211e may be disposed under the third and fourth sensing parts 211c and 211d in diagonal directions, respectively, and the first sensing part 211a may be disposed under the second sensing part 211b in a diagonal direction. As shown in FIGS. 4 and 5, disposition of the first to fifth sensing parts 211a to 211e may be varied. Such variation in disposition of the sensing parts 211 does not depart from the principle that the sensing units 211 are disposed to correspond to the muscles 4 moving the fingers, respectively, and, as such, may fall within the scope of the present disclosure.

Figure 6:
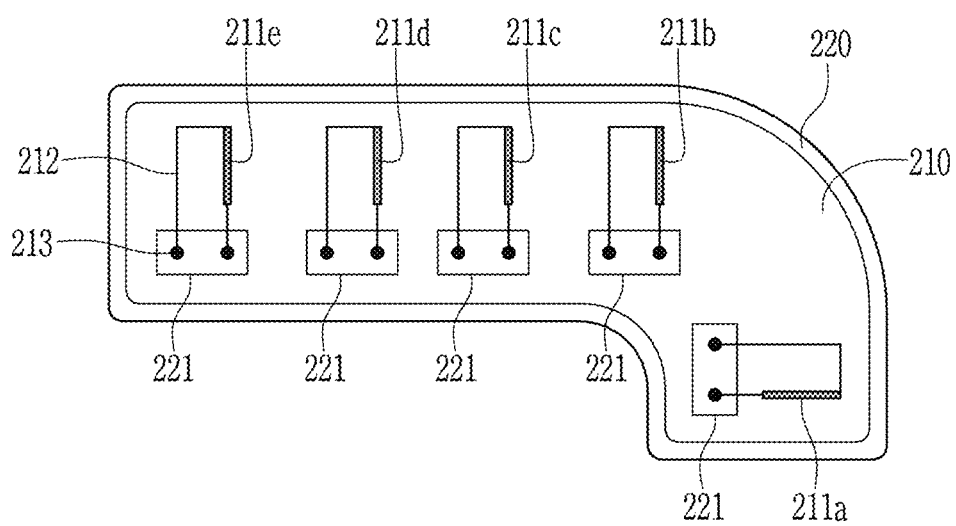
FIG. 6 is a view showing a structure of the gesture detection sensor according to another exemplary embodiment of the present disclosure.

FIG. 6 is a view showing a structure of the gesture detection sensor 20 according to another exemplary embodiment of the present disclosure.

The gesture detection sensor 20 may include exposure parts 221 formed to correspond to a plurality of sensing parts 211, respectively. In the gesture detection sensor 20 shown in each of FIGS. 2, 4, and 5, the first contact pads 213 connected to the plurality of sensing parts 211 are concentrated at one exposure part 221. In the gesture detection sensor 20 shown in FIG. 6, however, a plurality of exposure parts 221 is formed at the cover sheet 220, and first contact pads 213 connected to respective sensing parts 211 are exposed by respective exposure parts 221, differently from those of the gesture detection sensor 20 shown in each of FIGS. 2, 4, and 5. Since the exposure parts 221 are formed adjacent to the plurality of sensing parts 211, respectively, in the gesture detection sensor 20 of FIG. 6, it is unnecessary for each electrode pattern 212 to have a great length, differently from that of the gesture detection sensor 20 shown in each of FIGS. 2, 4, and 5. Accordingly, the area of the base sheet 210 and the area of the cover sheet 220 may be minimized. The second to fifth sensing parts 211b to 211e are disposed in parallel, and the first sensing part 211a is disposed to be directed to the thumb, and, as such, the entire structure of the gesture detection sensor 20 may be formed to have a bent shape. The gesture detection sensor 20 shown in FIG. 6 has a smaller area than that of the gesture detection sensor 20 shown in each of FIGS. 2, 4, and 5 and, as such, exhibits reduced inconvenience in a state of being attached to the back of the hand.

Figure 7:
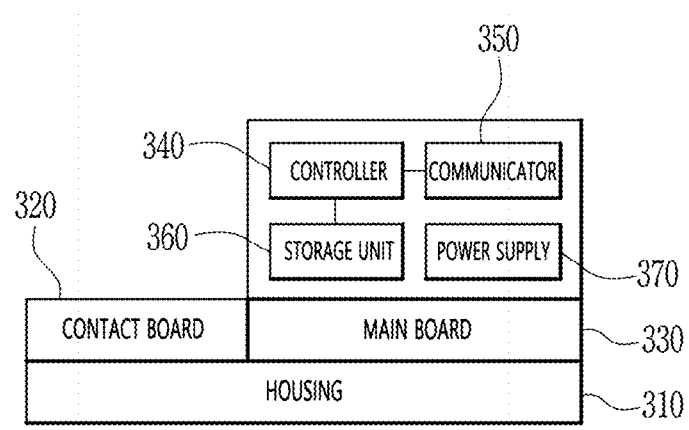
FIG. 7 is a block diagram showing a reader module according to an exemplary embodiment of the present invention.

FIG. 7 is a block diagram showing the reader module 30 according to the exemplary embodiment of the present invention.

The reader module 30 may include the contact board 320, which is connected to the gesture detection sensor 20 attached to the skin 3 and is configured to receive an electrical signal varying in accordance with movement of a finger, a communicator 350 configured to transmit and receive data to and from the computing device 40, a controller 340 configured to receive the electrical signal from the contact board 320 and to transmit the received electrical signal to the computing device 40 via the communicator 350, a main board 330 connected to the contact board 320 and mounted with the communicator 350 and the controller 340 thereon, and a housing 310 configured to support the contact board 320 and the main board 330 disposed therein and formed to expose a portion of the contact board 320.

The housing 310 may support the main board 330 and the contact board 320 disposed therein. The housing 310 may be formed to have a compact structure such that the housing 310 is attachable to the hand back 2. The housing 310 may include a button for turn-on/off of the reader module 30, and a display unit (not shown) configured to display a state of the reader module 30. The display unit may include a diode or a miniature display in order to display a communication connection state, a battery charging state, and other information.

The contact board 320 may be connected to the gesture detection sensor 20 and, as such, may receive an electrical signal. A portion of the contact board 320 may be exposed to an outside of the housing 310. The portion of the contact board 320 exposed to the outside of the housing 310 may be connected to the reader module 30. The contact board 320 may be connected to the main board 330 and, as such, may transmit an electrical signal to the main board 330.

The main board 330 may fix the controller 340, the communicator 350, a storage unit 360, and a power supply 370. The main board 330 may be fixed to the housing 310. The main board 330 may be connected to the contact board 320 and, as such, may receive an electrical signal from the contact board 320, and may transmit the electrical signal to the controller 340.

The communicator 350 of the reader module 30 may transmit and receive data to and from the computing device 40 in a wired or wireless manner. The communicator 350 of the reader module 30 may utilize various communication systems, for example, near field communication such as Wi-Fi, Bluetooth, Zigbee, or the like, 5G wireless communication, 6G wireless communication, and wired communication such as WAN, LAN, Ethernet, or the like. The communicator 350, the controller 340, and the storage unit 360 of the reader module 30 may be interconnected such that data transmission and reception thereamong are possible.

The storage unit 360 of the reader module 30 may store an electrical signal received from the gesture detection sensor 20, a command executable by the controller 340 and prepared for execution of a function of the reader module 30, and other necessary data. The storage unit 360 of the reader module 30 may include RAM, ROM, memory, an SD card, or the like.

The controller 340 of the reader module 30 may include a central processing unit (CPU), an application processor (AP), a processor 410, an application-specific integrated circuit (ASIC), a system-on-chip (SOC), other information processing units, or a combination thereof. The controller 340 may convert an analog electrical signal received from the gesture detection sensor 20 into a digital signal. The controller 340 may read and execute a command stored in the storage unit 360 and, as such, may execute a function of the controller 340.

The controller 340 may execute the following functions. The controller 340 may transmit an electrical signal received from the gesture detection sensor 20 to the computing device 40 via the communicator 350. In accordance with the kind of the sensing part 211, the controller 340 may calculate a resistance variation of the strain gauge, and may then transmit the calculated resistance variation to the computing device or may calculate a variation in pressure, and may then transmit the calculated pressure variation to the computing device 40. The controller 340 may calculate a resistance variation based on a variation in the electrical signal received from each of the first to fifth sensing parts 211a to 211e, and may then transmit the calculated resistance variation to the computing device 40. The controller 340 may determine whether or not the reader module 30 is in a state of being communication-connected with the computing device 40, and may then display the determined state through the display unit of the housing 310. The controller 340 may determine a connection state between the reader module 30 and the gesture detection sensor 20, and may then display the determined state through the display unit of the housing 310. The controller 340 may check a charged state of the reader module 30, and may then display the checked state through the display unit of the housing 310.

The power supply 370 may include a battery. The battery may be a rechargeable secondary battery. The power supply 370 may be charged in a state of being connected to an external power source. The power supply 370 may supply electric power for operation of the reader module 30 and the gesture detection sensor 20.

Figure 8:
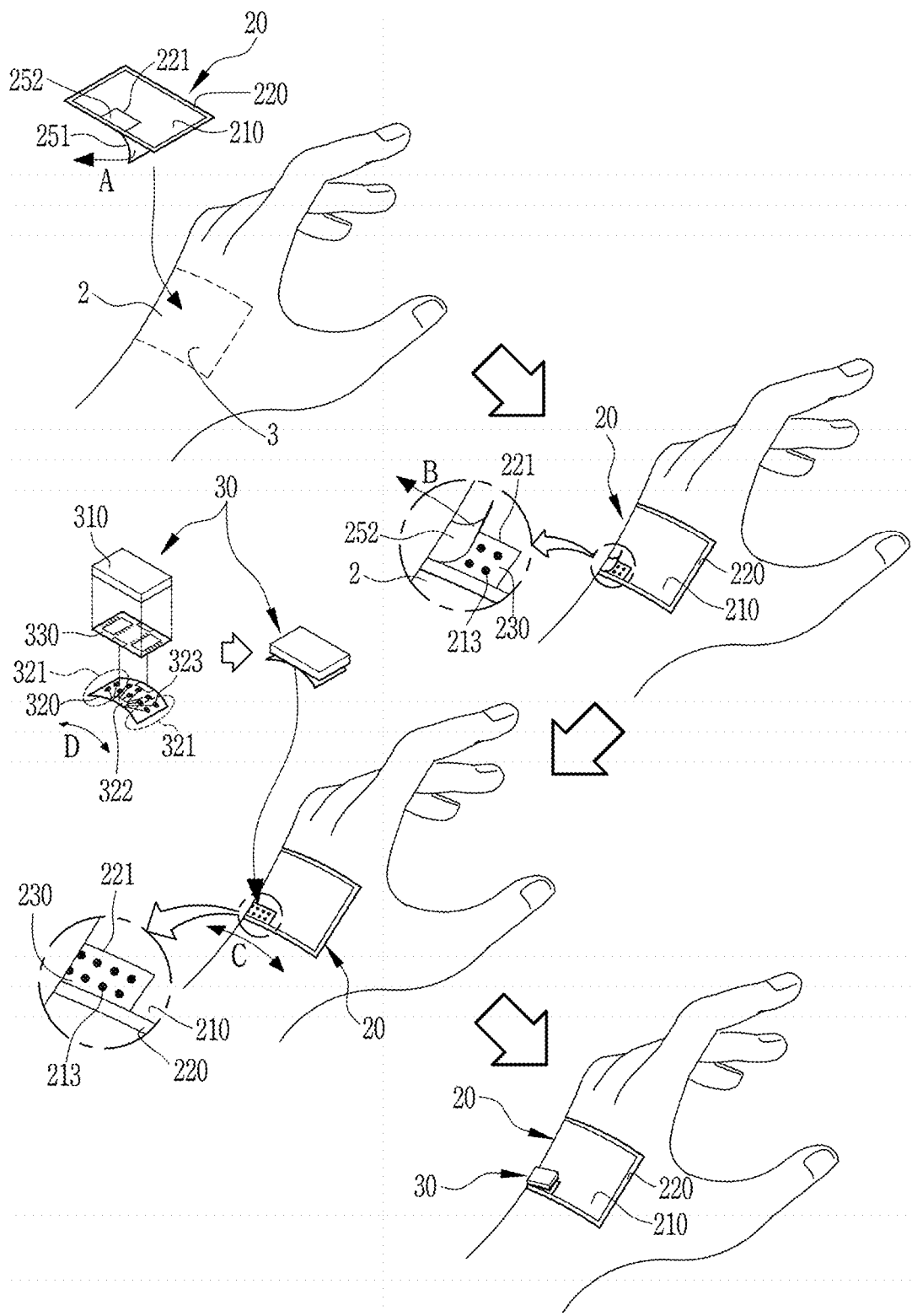
FIG. 8 is a view showing coupling between the gesture detection sensor and the reader module in accordance with an exemplary embodiment of the present disclosure.

FIG. 8 is a view showing coupling between the gesture detection sensor 20 and the reader module 30 in accordance with an exemplary embodiment of the present disclosure.

The gesture detection sensor 20 may further include a first protection layer 251 configured to be removed prior to attachment of the base sheet 210 to the skin 3, and a second protection layer 252 configured to be removed prior to adhesion of the reader module 30 to the adhesive layer 230.

The gesture detection sensor 20 may further include the first protection layer 251 which is configured to cover a surface of the base sheet 210 to be attached to the hand back 2. The first protection layer 251 may be formed to be temporarily adhered to the base sheet 210. The first protection layer 251 may cover the base sheet 210 such that the base sheet 210 is not exposed, thereby preventing attachment of foreign matter to the base sheet 210. The user may remove the first protection layer 251 before attaching the base sheet 210 to the skin 3. The first protection layer 251 may also cover a surface of the cover sheet 220 to be attached to the hand back 2. The user may attach the gesture detection sensor 20 to the hand back 2 after removing the first protection layer 251 adhered to the base sheet 210 (cf. an arrow A in FIG. 7). In this case, the user may attach the gesture detection sensor 20 to the hand back 2 such that the first to fifth sensing parts 211a to 211e correspond to positions of muscles 4 moving the fingers, respectively.

The gesture detection sensor 20 may further include the second protection layer 252 which covers the adhesive layer 230. The second protection layer 252 may be formed to be temporarily adhered to the adhesive layer 230. The second protection layer 252 may cover the adhesive layer 230 such that the adhesive layer 230 is not exposed, thereby enabling the adhesive layer 230 to maintain adhesion force. The user may remove the second protection layer 252 before adhering the reader module 30 to the adhesive layer 230. The user may attach the gesture detection sensor 20 to the hand back 2, and may then adhere the reader module 30 to the adhesive layer 230 after removing the second protection layer 252 (cf. an arrow B in FIG. 7).

The contact board 320 of the reader module 30 may include a flexible part 321 formed of a flexible material and connected to the electrode pattern 212 of the gesture detection sensor 20, and a fixed part 322 physically fixedly connected to the main board 330 and configured to transmit an electrical signal received by the flexible part 321 to the main board 330.

The contact board 320 may be formed of a flexible printed circuit board (FPCB). The contact board 320 may include a second contact pad 323 formed to have the same arrangement as that of the first contact pad 213. The second contact pad 323 may be electrically connected to the main board 330 via the fixed part 322. The flexible part 321 of the contact board 320 may be deformed in accordance with a curvature of the hand back 2. Generally, the curvature of the hand back 2 (cf. an arrow C in FIG. 7) has a shape in which the hand back 2 is high at a middle finger portion thereof while being gradually lowered as the hand back 2 extends toward the thumb 5a and the ring finger 5d. That is, the hand back 2 has a convex shape. When the gesture detection sensor 20 is attached to the hand back 2, the portion of the exposure part 221, at which the first electrode pads are concentratedly formed, also has the same curvature as that of the hand back 2. The flexible part 321 may be bent in the same direction as that of the curvature of the hand back 2 (cf. an arrow D in FIG. 7). When the flexible part 321 is adhered to the adhesive layer 230, the flexible part 321 is bent in accordance with the shape of the hand back 2 and, as such, the first contact pad 213 formed at the base sheet 210 and the second contact pad 323 formed at the flexible part 321 may be securely interconnected. The flexible part 321 may be adhered to the adhesive layer 230 formed on the base sheet 210 within the exposure part 221. The adhesive layer 230 may bring the base sheet 210 and the flexible part 321 into tight contact with each other such that the first contact pad 213 and the second contact pad 323 contact each other.

The fixed part 322 of the contact board 320 may be a part physically fixed to the housing 310 or the main board 330. The fixed part 322 may be electrically connected to the main board 330. The fixed part 322 may be electrically connected to the second contact pad 323 while being electrically connected to the main board 330. The fixed part 322 may be formed at a middle finger portion of the contact board 320. The fixed part 322 may be formed at two or more portions of the contact board 320. The fixed part 322 may be formed in plural in directions toward the wrist and the middle finger 5c. The contact board 320 is adhered to the gesture detection sensor 20, the main board 330 is fixed to the contact board 320, and the main board 330 is fixed by the housing 310. Accordingly, the reader module 30 may be adhered to the gesture detection sensor 20.

Figure 9:
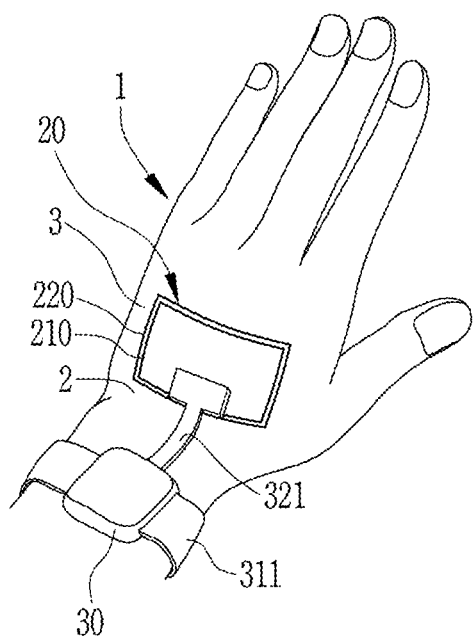
FIG. 9 is a view showing coupling between the gesture detection sensor and the reader module in accordance with another exemplary embodiment of the present disclosure.

FIG. 9 is a view showing coupling between the gesture detection sensor 20 and the reader module 30 in accordance with another exemplary embodiment of the present disclosure.

The housing 310 of the reader module 30 may be held on the wrist, and the flexible part 321 may extend from the housing 310 such that the flexible part 321 may be connected to the gesture detection sensor 20. A band 311 may be provided at the housing 310 and, as such, the housing 310 may be held on the wrist of the user by the band 311. One end of the flexible part 321 of the contact board 320 may extend lengthily so that the flexible part 321 may be exposed to the outside of the housing 310. The exposed flexible part 321 may be adhered to the adhesive layer 230 of the gesture detection sensor 20. The band 311 may support the weight of the reader module 30, differently from the structure shown in FIG. 8. Since the reader module 30 is held on the wrist by the band 311, the possibility that the reader module 30 is separated from the gesture detection module 20 is reduced. In addition, connection between the reader module 30 and the gesture detection sensor 20 may be stably maintained.

Figure 10:
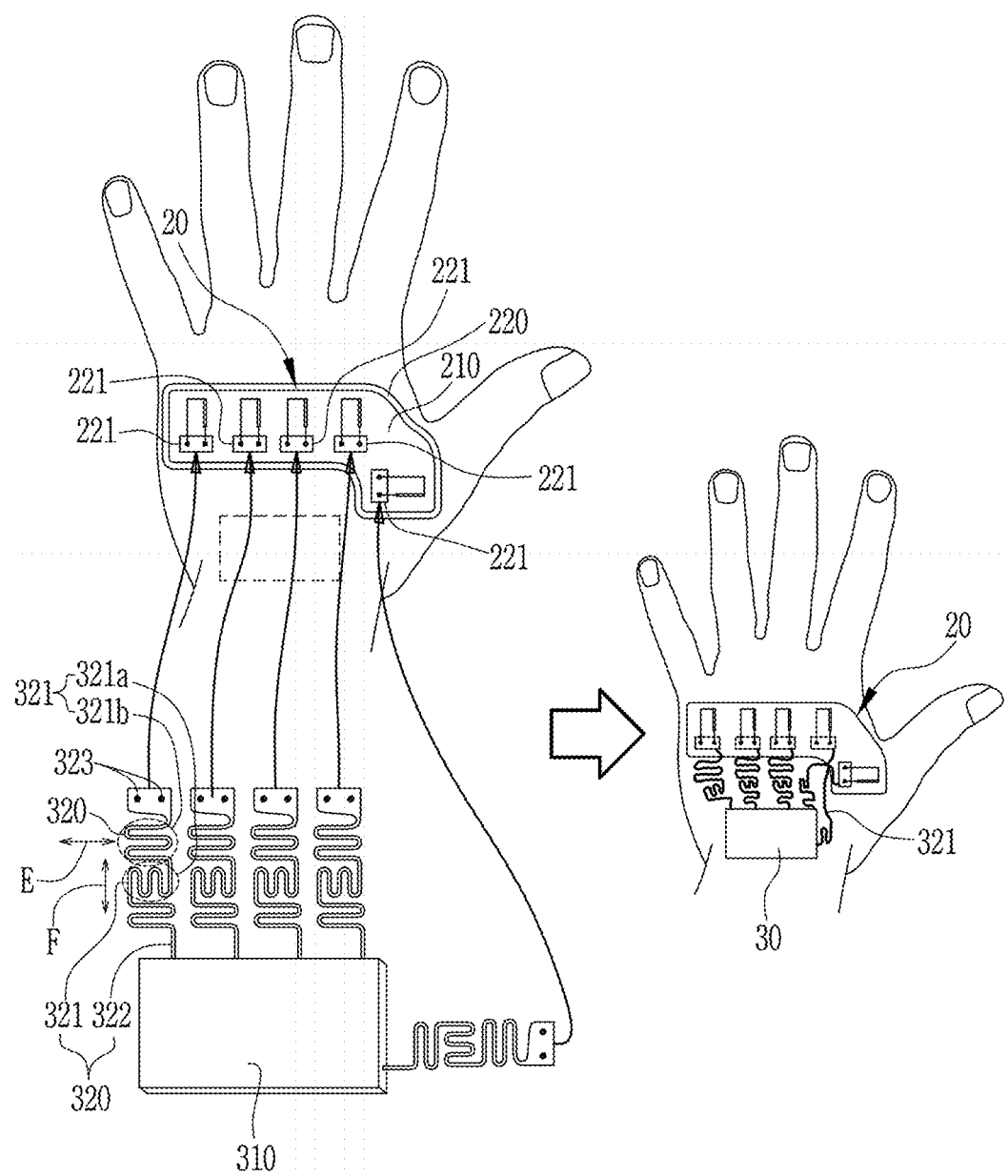
FIG. 10 is a view showing coupling between the gesture detection sensor and the reader module in accordance with another exemplary embodiment of the present disclosure.

FIG. 10 is a view showing coupling between the gesture detection sensor 20 and the reader module 30 in accordance with another exemplary embodiment of the present disclosure. In this embodiment, FIG. 6 is also referred to.

The flexible part 321 of the contact board 320 may be provided in plural such that the plural flexible parts 321 may extend from the housing 300, and may be connected to plural exposure parts 221 of the gesture detection sensor 20, respectively. In the gesture detection sensor 20 shown in FIG. 6, exposure parts 221 are formed at respective sensing parts 211. Accordingly, the contact board 320 may include a plurality of flexible parts 321, for connection thereof to the gesture detection sensor 20 shown in FIG. 6. The number of flexible parts 321 protruding from the housing 300 may be equal to the number of sensing parts 211. When the exposure parts 221 of the gesture detection sensor 20 are formed such that one exposure part 221 corresponds to two sensing parts 211, the flexible parts 321 may protrude such that one flexile part 321 corresponds to two sensing parts 211. The second contact pad 323 may be formed at an end of each flexible part 321. The second contact pad 323 may be electrically connected to the main board 330 via the contact board 320. The end of the flexible part 321 may be attached to the exposure part 221 of the gesture detection sensor 20 corresponding to the flexible part 321. The attachment structure between the second contact pad 323 at the end of the flexible part 321 and the first contact pad 213 of the gesture detection sensor 20 is similar to the attachment structure shown in an enlarged view of FIG. 3.

The flexible part 321 may be formed to have a serpentine shape. The flexible part 321 may be formed of an FPCB. The FPCB is flexible, but may not have stretchability. When the user gestures, the distance between the reader module 30 and the gesture detection sensor 20 may be varied. Since the flexible part 321 formed to have a serpentine shape has structural stretchability, contact between the first contact pad 213 and the second contact pad 323 may be maintained even when the distance between the reader module 30 and the gesture detection sensor 20 is varied. The flexible part 321 may include a first flexible portion 321a formed with a serpentine extending in a first direction E, and a second flexible portion 321b formed with a serpentine extending in a second direction F. When serpentines are formed to extend in the first direction E and the second direction F perpendicular to each other, respectively, the flexible part 321 may also cope with a deformation caused by stretch or twist in terms of structure. Accordingly, even when diverse gestures are made, contact between the first contact pad 213 and the second contact pad 323 may be securely maintained.

The reader module 30 may be adhered to the back of the hand. The reader module 30 may further include an adhesive material at a bottom thereof. The reader module 30 may be held on the wrist or the hand using a band. The reader module 30 may be hung on the flexible part 321 without being held on the hand.

Figure 11:
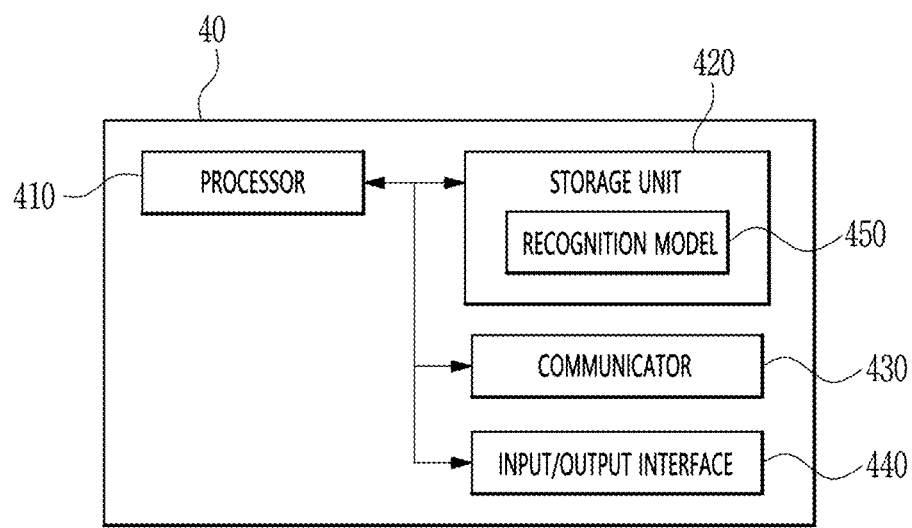
FIG. 11 is a block diagram showing a configuration of a computing device according to an exemplary embodiment of the present disclosure.

FIG. 11 is a block diagram showing a configuration of the computing device 40 according to an exemplary embodiment of the present disclosure.

The computing device 40 may include a communicator 430 connected to the reader module 30, to receive data from the reader module 30, a storage unit 420 configured to store a recognition model 450 configured to learn a pattern of an electrical signal including movements of a plurality of fingers, thereby recognizing a gesture, and a processor 410 configured to input the electrical signal to the recognition model 450, thereby recognizing the gesture. The computing device 40 may further include an input/output interface 440 configured to receive a command from the user and to provide information to the user in a visible or audible manner.

The computing device 40 may be an electronic device configured to receive a gesture input, thereby executing a predetermined command. The computing device 40 may include a personal computer (PC), a smart TV, a smartphone, a tablet PC, a video game console, a virtual reality (VR) device, an augmented reality (AR) device, a metaverse accessing device, a server, a home electronic appliance, military equipment, and various other devices capable of receiving gesture input, thereby executing a predetermined command. When the user gestures in a state of wearing the gesture detection sensor 20 and the reader module 30, the gesture detection sensor 20 and the reader module 30 may detect a variation in electrical signal, and may then provide resultant data to the computing device 40, and the computing device 40 may then analyze the data, thereby determining which gesture has been made.

The computing device 40 may be connected to the reader module 30 in a wired or wireless manner and, as such, may receive data from the reader module 30. The communicator 420 of the computing device 40 may transmit and receive data to and from the reader module 30 in a wired or wireless manner. The communicator 420 of the computing device 40 may utilize various communication systems, for example, near field communication such as Wi-Fi, Bluetooth, Zigbee, or the like, 5G wireless communication, 6G wireless communication, and wired communication such as WAN, LAN, Ethernet, or the like. The processor 410, the storage unit 420, the communicator 430, and the input/output interface 440 may be interconnected such that data transmission and reception thereamong are possible.

The storage unit 430 of the computing device 40 may store an electrical signal received from the reader module 30, a command executable by the processor 410 and prepared for execution of a function of the computing device 40, kinds of gestures, a command to be executed when a gesture is input, and other necessary data. The storage unit 430 of the computing device 40 may include RAM, ROM, memory, an SD card, a hard disk, a cloud storage medium, or the like.

The input/output interface 440 may include an input device such as a keyboard, a mouse, a touchpad, a joystick, a touch screen, or the like, and an output device such as a display, a speaker, a beam projector, a printer, smartglasses, a head mounted display (HMD), or the like. The input/output interface 440 may output results of execution of a predetermined command by the processor 410 according to a gesture input by the user. The input/output interface 440 may also receive a command from the user through a method other than a gesture.

The processor 410 may include a central processing unit (CPU), an application processor (AP), a graphics processing unit (GPU), a neuromorphic chip, other information processing units, or the like. The processor 410 reads a command stored in the storage unit 420 and executes the read command, thereby enabling the computing device 40 to perform a predetermined function. The processor 410 may recognize a gesture using the recognition model 450 stored in the storage unit 420. The recognition model 450 stored in the storage unit 420 may be an artificial intelligence model in a learning-completed state. The recognition model 450 may have neural network architecture such as a convolutional neural network (CNN) or a recurrent neural network (RNN).

The recognition model 450 may be an artificial intelligence model configured to perform learning through a learning data set using, as input data, a first electrical signal reflecting movement of the thumb 5a, a second electrical signal reflecting movement of the index finger 5b, a third electrical signal reflecting movement of the middle finger 5c, a fourth electrical signal reflecting movement of the ring finger 5d, and a fifth electrical signal reflecting movement of the baby finger 5e when a particular gesture is made, while using the kind of a particular gesture as labeled date, and to output a kind of a gesture when the first to fifth electrical signals corresponding to the gesture are input.

The processor 410 may pre-process an electrical signal received from the reader module 30, and input the pre-processed electrical signal to the learned recognition model 450. When the recognition model 450 outputs a kind of a gesture, the processor 410 may recognize that the user has made a particular gesture. The processor 410 may execute a predetermined command in accordance with the kind of the gesture determined by the recognition model 450. When a plurality of gestures is input, the processor 410 may execute various commands in accordance with a combination of the gestures. The processor 410 may execute different commands in accordance with a gesture input order, a gesture made by a left hand 1, and a gesture made by a right hand.

Figure 12:
FIG. 12 is a view showing gestures recognizable through a gesture input system according to an exemplary embodiment of the present disclosure.
Figure 12:
Figure 12:
Figure 12:
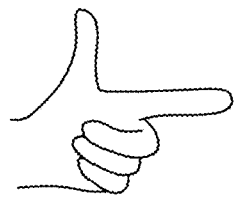
Figure 12:
Figure 12:
Figure 12:
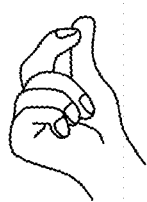
Figure 12:
Figure 12:
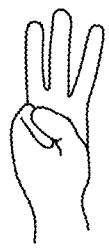
Figure 12:
Figure 12:

FIG. 12 is a view showing gestures recognizable through a gesture input system according to an exemplary embodiment of the present disclosure.

Kinds of gestures learnable by the recognition model 450 are diverse. For example, FIG. 12 shows eleven gestures. FIG. 12 represents kinds of different gestures such as paper (P), rock (R), scissors (S), gun (G), OK (ok), thumb-up (U), nip (N), one (1), three (3), four (4), and three-with-thumb (3T). The recognition model 450 may not only recognize a gesture in a state in which at least a part of the fingers is folded or unfolded, but also may recognize a gesture forming a particular shape by the fingers. For example, the recognition model 450 may recognize a gesture such as OK or nip.

Figure 13:
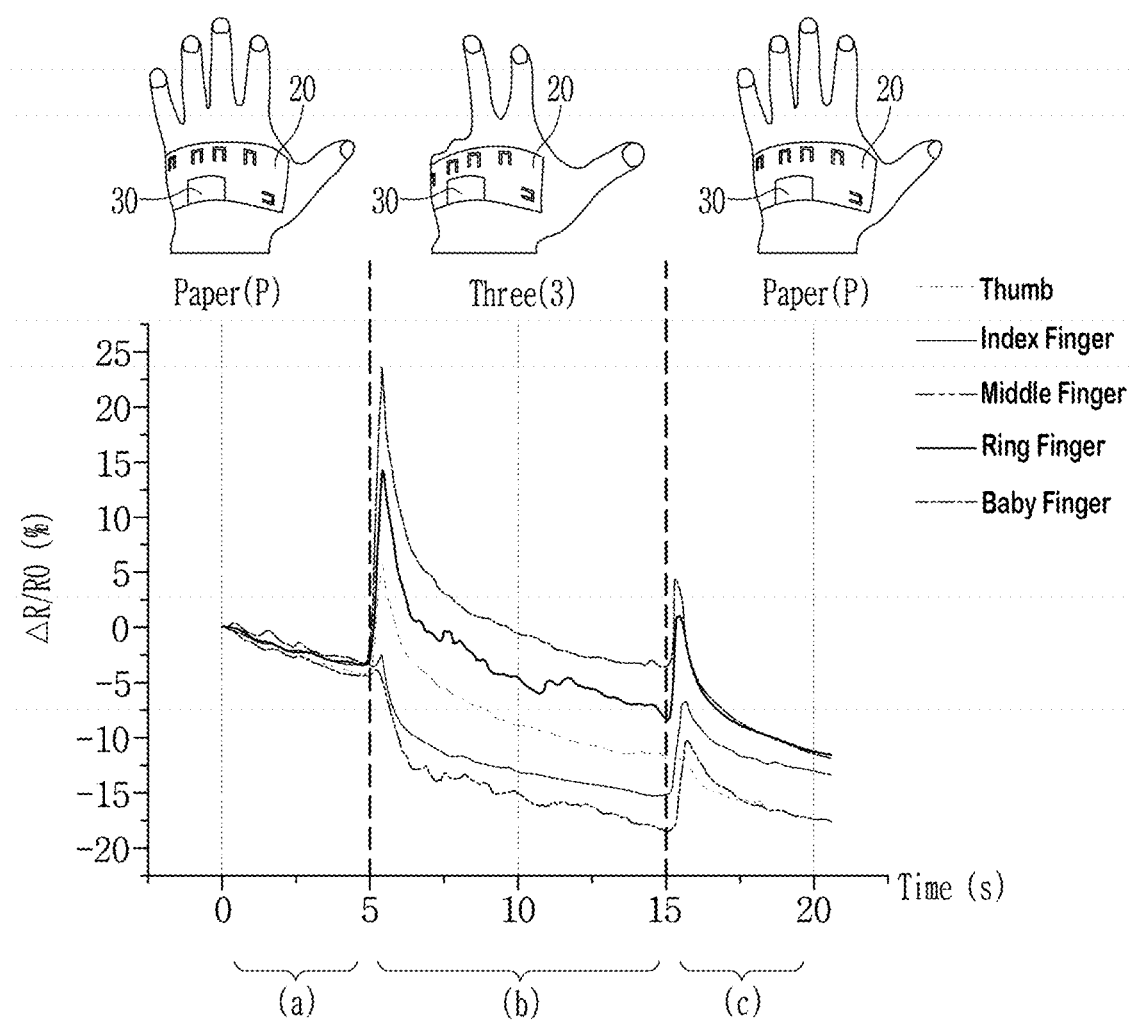
FIG. 13 is a view showing patterns of first to fifth electrical signals according to an exemplary embodiment of the present disclosure.

FIG. 13 is a view showing patterns of first to fifth electrical signals according to an exemplary embodiment of the present disclosure. FIG. 13 is a graph depicting a resistance variation using a sensing part 211 which is of a strain gauge type. The first to fifth electrical signals may reflect movements of the thumb to the baby finger. In FIG. 13, each electrical signal is represented by a resistance variation ($\Delta R/R0$) in the unit of percentage according to passage of time.

The recognition model 450 is not a simple model configured to compare variation degrees of the first to fifth electrical signals with a predetermined value. The recognition model 450 may learn electrical signal patterns including increase and decrease in levels of the first to fifth electrical signals, whether or not there is a peak in the first to fifth electrical signals, a variation in electrical signal in a stage transitioning from one gesture to another gesture, relative positions of the first to fifth electrical signals according to each gesture, etc.

For example, a period a in FIG. 13 corresponds to an electrical signal pattern generated when a gesture of paper (P) is made in a state in which the hand 1 is unfolded, a period b in FIG. 13 corresponds to an electrical signal pattern generated when a gesture of three (3) is made in a state in which the thumb 5a, the index finger 5b, and the middle finger 5c are unfolded, and the ring finger 5d and the baby finger 5e are folded, and a period c in FIG. 13 corresponds to an electrical signal pattern generated when a gesture of paper (P) is made in a state in which the hand 1 is again unfolded. Although the electrical signal in the period a and the electrical signal in the period c correspond to the same gesture, these electrical signals have different levels, respectively. In a system in which a variation degree of an electrical signal or a level of an electrical signal is simply compared with a reference range, the gesture in the period a and the gesture in the period c may be recognized as being different ones, respectively. However, the recognition model according to the exemplary embodiment of the present disclosure may learn variation patterns of electrical signals and, as such, may recognize correct gestures through learning of a pattern of an electrical signal varying in a stage transitioning from one gesture to another gesture.

As apparent from the above description, in accordance with an aspect of the present disclosure, the gesture detection sensor may be attachable only to a portion of the hand and may be disposable and, as such, may provide a convenient and hygienic gesture input environment.

In accordance with another aspect of the present disclosure, the reader module may be detachably adhered to the gesture detection sensor, and may be again usable.

In accordance with another aspect of the present disclosure, the gesture detection system may provide a gesture input environment hygienically usable by a plurality of users at low cost.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

Simple modifications and alterations fall within the scope of the disclosure, and the protection scope of the disclosure will be apparent from the appended claims.

What is claimed is:

1. A gesture detection sensor comprising:
   a base sheet formed of a skin-conformable material and configured to be tightly attached to a skin;
   a sensing part formed at the base sheet and configured to measure deformation of the skin;
   an electrode pattern formed at the base sheet and connected, at one end thereof, to the sensing part, to transmit an electrical signal varying in accordance with the deformation of the skin;
   a cover sheet configured to cover the base sheet and to be adhered to the skin, thereby fixing the base sheet to the skin; and
   a first contact pad disposed at another end of the electrode pattern and connected to the reader module,
   wherein the cover sheet comprises an exposure part formed through removal of a portion of the cover sheet and configured to expose a portion of the cover sheet where the first contact pad is formed.

2. The gesture detection sensor according to claim 1, wherein the sensing part comprises a strain gauge pattern, to measure the deformation of the skin through a variation in resistance.

3. The gesture detection sensor according to claim 1, further comprising:
   an adhesive layer formed on a portion of the base sheet exposed by the exposure part, to fix the reader module.

4. The gesture detection sensor according to claim 3, further comprising:
   a first protection layer configured to be removed prior to attachment of the base sheet to the skin; and
   a second protection layer configured to be removed prior to adhesion of the reader module to the adhesive layer.

5. The gesture detection sensor according to claim 1, wherein:
   the base sheet is attached to a back of a hand; and
   the sensing part comprises at least one of:
   a first sensing part configured to measure deformation of the skin caused by movement of a thumb;
   a second sensing part configured to measure deformation of the skin caused by movement of an index finger;
   a third sensing part configured to measure deformation of the skin caused by movement of a middle finger;
   a fourth sensing part configured to measure deformation of the skin caused by movement of a ring finger; or
   a fifth sensing part configured to measure deformation of the skin caused by movement of a baby finger.

6. The gesture detection sensor according to claim 5, further comprising:
   a cover sheet configured to cover the base sheet and to be attached to the skin, thereby fixing the base sheet to the skin,
   wherein the cover sheet comprises an exposure part formed through removal of a portion of the cover sheet and configured to expose a portion of the cover sheet where a first contact pad disposed at another end of the electrode pattern and connected to the reader module is formed, and
   wherein the exposure part is formed in plural such that the plural exposure parts are formed at the plural sensing parts, respectively.

7. The gesture detection sensor according to claim 5, further comprising:
   an isolation structure configured to isolate the first to fifth sensing parts from one another,
   wherein the isolation structure is formed through removal of portions of the base sheet and portions of the cover sheet disposed among the first to fifth sensing parts.

8. The gesture detection sensor according to claim 7, wherein the isolation structure is formed by further forming an isolation layer made of a material having stretchability lower than stretchability of the base sheet or the cover sheet among the first to fifth sensing parts.

9. A gesture detection sensor comprising:
   a base sheet formed of a skin-conformable material and configured to be tightly attached to a skin;
   a sensing part formed at the base sheet and configured to measure deformation of the skin; and
   an electrode pattern formed at the base sheet and connected, at one end thereof, to the sensing part, to transmit an electrical signal varying in accordance with the deformation of the skin, wherein:
   the base sheet is attached to a back of a hand; and
   the sensing part comprises at least one of:
   a first sensing part configured to measure deformation of the skin caused by movement of a thumb;
   a second sensing part configured to measure deformation of the skin caused by movement of an index finger;
   a third sensing part configured to measure deformation of the skin caused by movement of a middle finger;
   a fourth sensing part configured to measure deformation of the skin caused by movement of a ring finger; or
   a fifth sensing part configured to measure deformation of the skin caused by movement of a baby finger.

10. The gesture detection sensor according to claim 9, further comprising:
    a cover sheet configured to cover the base sheet and to be attached to the skin, thereby fixing the base sheet to the skin,
    wherein the cover sheet comprises an exposure part formed through removal of a portion of the cover sheet and configured to expose a portion of the cover sheet where a first contact pad disposed at another end of the electrode pattern and connected to the reader module is formed, and
    wherein the exposure part is formed in plural such that the plural exposure parts are formed at the plural sensing parts, respectively.

11. The gesture detection sensor according to claim 9, further comprising:
    an isolation structure configured to isolate the first to fifth sensing parts from one another, wherein the isolation structure is formed through removal of portions of the base sheet and portions of the cover sheet disposed among the first to fifth sensing parts.

12. The gesture detection sensor according to claim 11, wherein the isolation structure is formed by further forming an isolation layer made of a material having stretchability lower than stretchability of the base sheet or the cover sheet among the first to fifth sensing parts.

13. A reader module comprising:
   a contact board connected to a gesture detection sensor attached to a skin and configured to receive an electrical signal varying in accordance with movement of a finger;
   a communicator configured to transmit and receive data to and from a computing device;
   a controller configured to receive the electrical signal from the contact board and to transmit the received electrical signal to the computing device via the communicator;
   a main board connected to the contact board and mounted with the communicator and the controller thereon; and
   a housing configured to support the contact board and the main board disposed therein and formed to expose a portion of the contact board.

14. The reader module according to claim 13, wherein the contact board comprises:
   a flexible part formed of a flexible material and connected to an electrode pattern of the gesture detection sensor; and
   a fixed part physically fixedly connected to the main board and configured to transmit an electrical signal received by the flexible part to the main board.

15. The reader module according to claim 14, wherein the housing is held on a wrist, and the flexible part extends from the housing, and is connected to the gesture detection sensor.

16. The reader module according to claim 14, wherein the flexible part is formed to have a serpentine shape, and extends from the housing in plural such that the plural flexible parts are connected to plural exposure parts of the gesture detection sensor, respectively.

17. A gesture detection system comprising:
   a gesture detection sensor configured to be attached to a back of a hand of a user and to measure a variation in electrical signal caused by movement of a finger;
   a reader module configured to receive an electrical signal from the gesture detection sensor, thereby providing the electrical signal;
   a computing device configured to analyze the electrical signal received from the reader module for recognizing a gesture of the user; and
   a processor configured to recognize the gesture using a recognition model, including inputting the electrical signal to the recognition model, the recognition model configured to provide a result of recognizing the gesture based on a pattern of the electrical signal comprising movements of a plurality of fingers.

18. The gesture detection system according to claim 17, wherein the computing device comprises:
   a communicator connected to the reader module, to receive data from the reader module; and
   a storage unit configured to store the recognition model configured to learn a corresponding pattern of electrical signals comprising movements of the plurality of fingers.

19. The gesture detection system according to claim 18, wherein the recognition model is an artificial intelligence model configured to perform learning through a learning data set using, as input data, a first electrical signal reflecting movement of a thumb, a second electrical signal reflecting movement of an index finger, a third electrical signal reflecting movement of a middle finger, a fourth electrical signal reflecting movement of a ring finger, and a fifth electrical signal reflecting movement of a baby finger when a particular gesture is made, while using a kind of a particular gesture as labeled date, and to output a kind of a gesture when the first to fifth electrical signals corresponding to the gesture are input.

20. The gesture detection system according to claim 18, wherein the processor executes a predetermined command in accordance with the kind of gesture determined by the recognition model.

* * * * *